(12) United States Patent
Biskeborn et al.

(10) Patent No.: US 9,355,678 B2
(45) Date of Patent: May 31, 2016

(54) MAGNETIC STORAGE DEVICE WITH MULTIPLE READ ELEMENT ARRAYS TO DETERMINE QUALITY OF RECORDED DATA

(71) Applicant: International Business Machines Corporation, Armonk, NY (US)

(72) Inventors: Robert G. Biskeborn, Hollister, CA (US); Gary M. Decad, Palo Alto, CA (US); Calvin S. Lo, Saratoga, CA (US)

(73) Assignee: International Business Machines Corporation, Armonk, NY (US)

( * ) Notice: Subject to any disclaimer, the term of this patent is extended or adjusted under 35 U.S.C. 154(b) by 85 days.

(21) Appl. No.: 14/198,313

(22) Filed: Mar. 5, 2014

(65) Prior Publication Data

US 2015/0255093 A1    Sep. 10, 2015

(51) Int. Cl.
*G11B 5/29* (2006.01)
*G11B 20/10* (2006.01)
*G11B 5/008* (2006.01)
*G11B 5/33* (2006.01)
*G11B 5/48* (2006.01)

(52) U.S. Cl.
CPC ...... *G11B 20/10305* (2013.01); *G11B 5/00817* (2013.01); *G11B 5/29* (2013.01); *G11B 5/33* (2013.01); *G11B 5/4893* (2013.01)

(58) Field of Classification Search
None
See application file for complete search history.

(56) References Cited

U.S. PATENT DOCUMENTS

| 5,499,148 | A | 3/1996 | Kubota et al. |
| 6,188,532 | B1 | 2/2001 | Albrecht et al. |
| 6,618,216 | B2 | 9/2003 | Kitagawa |
| 6,671,140 | B1 * | 12/2003 | Ishiwata ............ 360/324.2 |
| 7,119,976 | B2 | 10/2006 | Biskeborn et al. |
| 7,382,569 | B2 | 6/2008 | Biskeborn et al. |
| 7,675,710 | B2 | 3/2010 | Hennecken et al. |
| 2011/0058271 | A1 * | 3/2011 | Biskeborn et al. .......... 360/39 |
| 2013/0148225 | A1 | 6/2013 | Coker et al. |

OTHER PUBLICATIONS

Jaquette, Glen A., "LTO: A Better Format for Mid-Range Tape", IBM Journal of Research and Developement 47, No. 4 (2003): pp. 429-444.

Lim, Fabian et al. "Analysis of Shingle-Write Readback Using Magnetic-Force Microscopy", IEEE Transactions on Magnetics vol. 46, No. 6 Jun. 2010: pp. 1548-1551.

Yamashita, Masato, et al., "Performance Evaluation of Neuro ITI Canceller for Two-Dimensional Magnetic Recording by Shingled Magnetic Recording", IEEE Transactions on Magnetics, vol. 49, No. 7, Jul. 2013, pp. 3810-3813.

Jubert et al., "Method for Characterizing and Monitoring the Effective Separation of Writer and Reader from Magnetic Media in Tape Recording Systems," IBM Research—Almaden, San Jose, CA 95120, Oct. 31, 2012, pp. 1-5.

* cited by examiner

*Primary Examiner* — Brian Butcher
(74) *Attorney, Agent, or Firm* — Kristofer L. Haggerty; Randall J. Bluestone (57) ABSTRACT

Determining quality metrics of recorded data on a magnetic recording medium. Each of two or more read element arrays include one or more read elements, each including a sensor. Each array differs from the other arrays in one or more construction characteristics such that each array has a different sensitivity to one or more characteristics of magnetic transitions recorded on a magnetic recording medium. Each array produces respective electrical signals that are characteristic of magnetic transitions recorded on a magnetic recording medium. A computer receives information from the electrical signals and analyzes the signal information to determine one or more values associated with one or more quality metrics of the magnetic transitions.

14 Claims, 8 Drawing Sheets

MAGNETIC STORAGE DEVICE WITH MULTIPLE READ ELEMENT ARRAYS TO DETERMINE QUALITY OF RECORDED DATA

FIELD OF THE INVENTION

The present invention relates generally to the field of magnetic information storage and retrieval, and more particularly to determining signal characteristics from recorded data on a magnetic recording media to determine quality metrics associated with the media and recorded data.

BACKGROUND OF THE INVENTION

Archival recording, such as to tape media, may require that tapes be written with a high degree of quality to satisfy auditing, retention, and other mission critical requirements. For example, the write quality on master or reference tapes in the media and entertainment industry may be extremely critical. Tape drives and other magnetic recording appliances are not typically configured to accurately determine the quality of recorded data on a magnetic recording medium.

SUMMARY

Embodiments of the present invention disclose a method and apparatus for determining quality metrics of recorded data on a magnetic recording medium. Each of two or more read element arrays include one or more read elements, each including a sensor. Each array differs from the other arrays in one or more construction characteristics such that each array has a different sensitivity to one or more characteristics of recorded magnetic transitions on a magnetic recording medium. Each array produces respective electrical signals that are characteristic of magnetic transitions recorded on a magnetic recording medium. A computer receives information from the electrical signals and analyzes the signal information to determine one or more values associated with one or more quality metrics of the magnetic transitions.

DETAILED DESCRIPTION

The present invention is directed generally to magnetic storage devices, such as tape appliances, that include multiple read element arrays that are used for determining quality metrics of a recorded magnetic medium. For example, tape drives typically include mechanisms to ensure that data is accurately written to tape. However, some of these mechanisms, such as error recovery, may mask problems that may be occurring at the write elements or at the magnetic media. For example, a tape drive performing a read-after-write operation may detect an error, and automatically rewrite the data to the tape. If the cause of the data error is degradation of a write element, the degradation may have to progress substantially before the error rate is considered unacceptable, and a notification is generated by the tape drive.

While degradation is progressing, the quality of the data written to the tape medium may be sufficient to satisfy the built-in quality control mechanisms of the tape drive, but may not be sufficient to satisfy, for example, contractual obligations. For example, certain archival applications, such as the creation of master or reference tapes in the media and entertainment industry, may require, by contract, that the data written to an archival tape be of very high quality. Recorded data quality may be defined by such metrics as a high signal-to-noise ratio (SNR), high magnetic field strength of data recorded to the magnetic medium, a small transition parameter, a small PW50 pulse width, a high degree of overwrite and/or other metrics that are known in the industry or metrics defined by agreement. The quality levels defined by agreement may be significantly more stringent than the acceptable levels of the magnetic recording device, as may be defined by standards and/or specifications. It would be advantageous to have a system that can accurately determine the quality of recorded data and the magnetic medium.

In embodiments of the invention, multiple read element arrays read recorded data, such as production data and/or test patterns, and erased media, on a magnetic medium, such as magnetic tape. A computer, for example, a microprocessor, analyzes the electric signals from the read elements and determines various quality metrics related to the recorded data and the underlying magnetic transitions on the tape medium. In an embodiment, a data track on a tape medium is read by two or more read elements having different characteristics, such as reader width. Different reader widths result in read elements having different sensitivities to the quality metrics, and to different types of magnetic medium defects, thus allowing for a more accurate analysis of the quality of the medium and the recorded data. In addition, analyses that combine information from different read element signals may produce a more accurate analysis of the quality of the tape and the recorded data than can be determined by analyses of the signals separately.

While embodiments of the invention are described with respect to a tape appliance and a magnetic tape medium, those of skill in the art will recognize that the inventive concepts described herein may be implemented in embodiments directed to related magnetic storage technologies, such as hard disk drives (HDDs), without undue experimentation, and without departing from the spirit of the invention, and these are, therefore, considered to be within the scope of the invention, as defined in the claims below.

For purposes of the description hereinafter, the terms "upper", "lower", "right", "left", "vertical", "horizontal", "top", "bottom", "outer", "inner", and derivatives thereof shall relate to the disclosed structures and methods, as oriented in the drawing figures. The terms "overlying", "atop", "on top", "positioned on" or "positioned atop" mean that a first element, such as a first structure, is present on a second element, such as a second structure, wherein intervening elements, such as an interface structure may be present between the first element and the second element. The term "direct contact" means that a first element, such as a first structure, and a second element, such as a second structure, are connected without any intermediary conducting, insulating or semiconductor layers at the interface of the two elements.

Figure 1A:
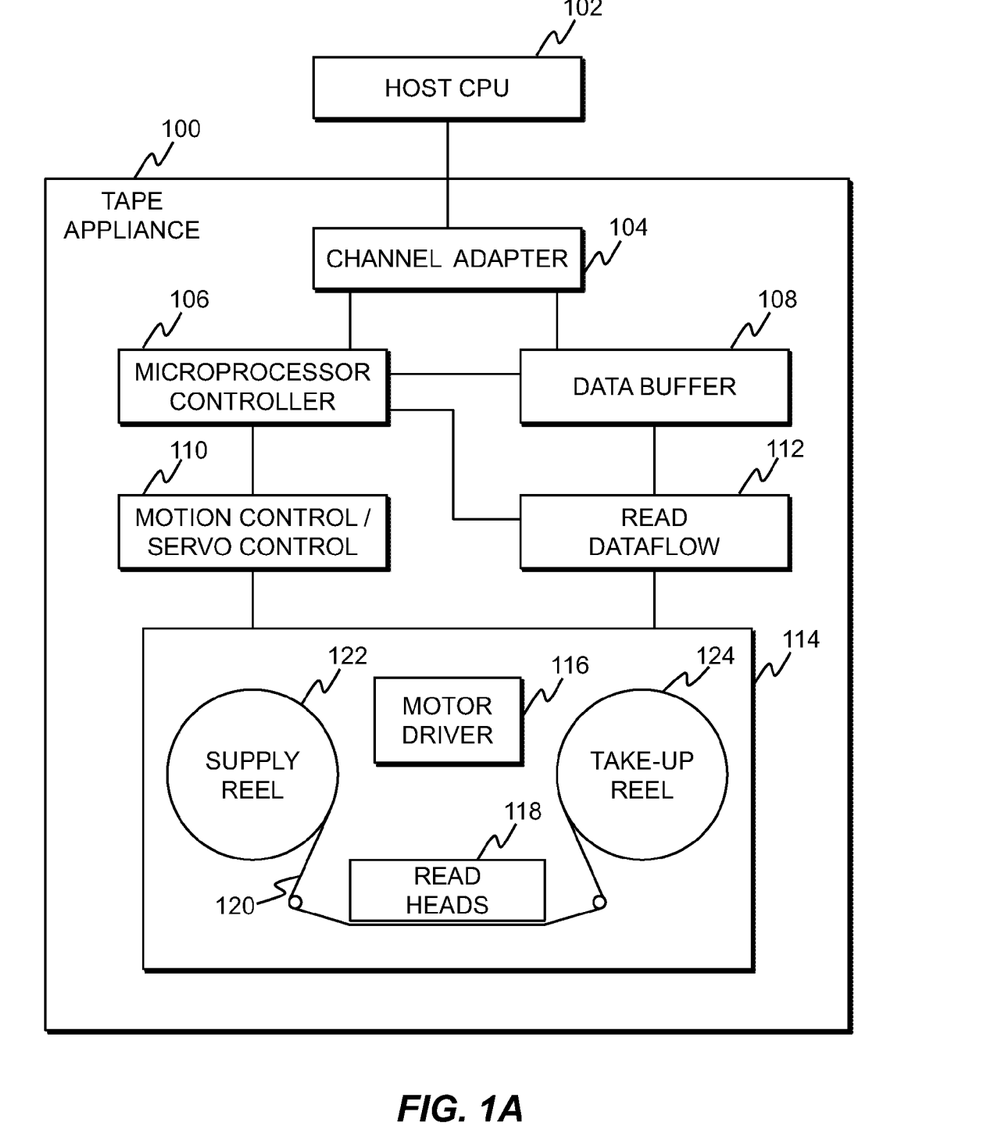
FIG. 1A is a functional block diagram illustrating a tape appliance, in accordance with an embodiment of the present invention.

FIG. 1A is a functional block diagram of a tape appliance 100, in accordance with an embodiment of the invention. In an exemplary embodiment, tape appliance 100 may be a special purpose tape drive for reading magnetic tapes. Tape appliance 100 may include several components providing a control and data transfer system for reading and writing data from a host CPU 102, an embodiment of which is described below in relation to FIG. 8, on a magnetic tape medium. By way of example only, those components may include a channel adapter 104, a computer, such as microprocessor controller 106, a data buffer 108, a read data flow circuit 112, a motion control system 110, and a tape interface system 114 that includes a motor driver circuit 116 and read heads 118.

Microprocessor controller 106 may provide overall control functionality for the operations of all other components of tape appliance 100. The functions performed by microprocessor controller 106 may be programmable via microcode routines (not shown) according to desired tape drive operational characteristics. During data read operations, read dataflow circuitry 112 is responsible for executing all read data transfer operations, under the control of microprocessor controller 106. Read dataflow circuitry 112 may receive electrical signals from tape interface system 114 representing physically formatted data recorded on a magnetic tape medium 120. Read dataflow circuitry 112 may format the signals into data blocks, and communicate the data blocks to data buffer 108 for buffering. Microprocessor controller 106 may activate channel adapter 104 to perform the required host interface protocol for transmitting an information data block to, for example, host CPU 102.

In certain embodiments, microprocessor controller 106 may receive information from the electrical signals, which may be the unformatted electrical signals from tape interface system 114, either directly or via read dataflow circuitry 112. In other embodiments, read dataflow circuitry 112 may perform various pre-processing functions on the electrical signals from tape interface system 114, and transmit information that is representative of the electrical signals to microprocessor controller 106. In these embodiments, microprocessor controller 106 may include appropriate electrical circuitry, logic, firmware, software, etc., to perform analysis of the electrical signals or information to determine various characteristics of the signals related to quality of the recorded data and the magnetic medium, in accordance with embodiments of the invention. In general, the appropriate electrical circuitry, logic, firmware, software, etc., to perform analysis of the electrical signals to determine various characteristics of the signals related to quality of the recorded data and the magnetic medium may be located in one or more functional components of a tape appliance, such as tape appliance 100, and/or in a host computer, such as host CPU 102.

Tape interface system 114 may include one or more read modules in read head unit 118, and drive motor components (not shown) for performing forward and reverse movement of a tape medium 120 mounted on a supply reel 122 and a take-up reel 124. The drive components of tape interface system 114 are controlled by motion control system 110 and motor driver circuit 116 to execute such tape movements as forward and reverse playback, rewind and other tape motion functions. In addition, in multi-track tape drive systems, motion control system 110 transversely positions read heads 118 relative to the direction of longitudinal tape movement in order to record data in a plurality of tracks. In an exemplary embodiment, head unit 118 includes read head modules only. In other embodiments, head unit 118 may include a combination of read modules, read/write modules, and/or write modules, in accordance with embodiments of the invention. In other embodiments, head unit 118 may include production read/write modules in addition to a special purpose read module(s), as described below.

Figures 1B, 2:
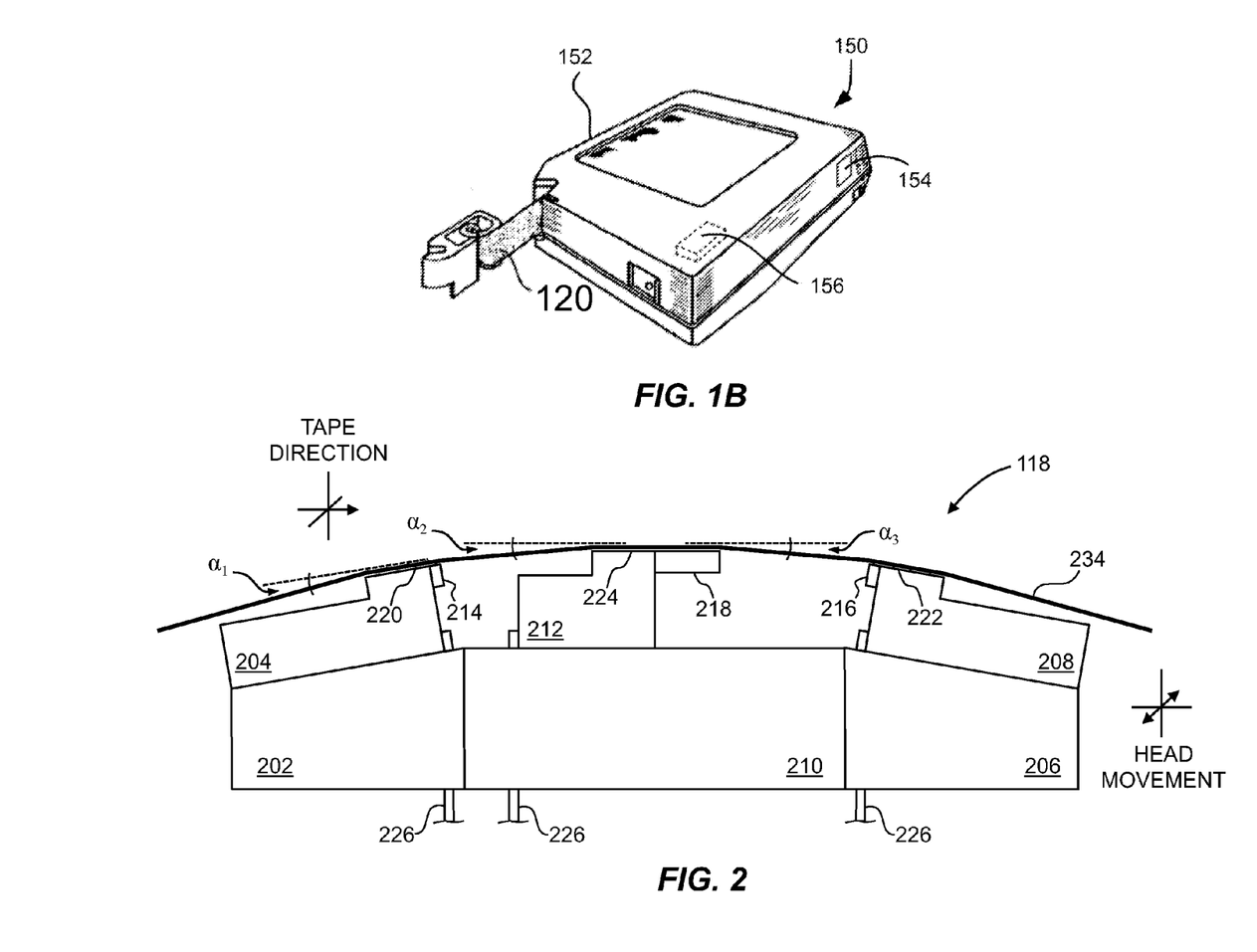
FIG. 1B illustrates an exemplary tape cartridge, in accordance with an embodiment of the present invention.
FIG. 2 illustrates a side view of a read head, in accordance with an embodiment of the invention.

FIG. 1B illustrates an exemplary tape cartridge 150 according to an embodiment. Tape cartridge 150 may be used with a system such as tape appliance 100 shown in FIG. 1A. As shown, tape cartridge 150 includes a housing 152, a tape 120 in the housing 152, and a nonvolatile memory 156 coupled to the housing 152. In some embodiments, the nonvolatile memory 156 may be embedded inside the housing 152. In other embodiments, the nonvolatile memory 156 may be attached to the inside or outside of the housing 152 without modification of the housing 152. For example, the nonvolatile memory may be embedded in a self-adhesive label 154. In one preferred embodiment, the nonvolatile memory 156 may be a flash memory device, ROM device, etc., embedded into or coupled to the inside or outside of the tape cartridge 150. The nonvolatile memory may be accessible by tape appliance 100, and the tape operating software (the driver software) residing on host CPU 102. In an exemplary embodiment, tape cartridge 150 meets the standards and specifications of one or more of the Linear Tape Open (LTO) generations, such as LTO-6. All trademarks used herein are the property of their respective owners. In such an embodiment, supply reel 122 may be integral to the LTO tape cartridge, and the end of tape 120 includes a leader pin (not shown) which is mechanically grasped by features (not shown) of tape interface system 114 and threaded onto tape-up reel 124.

FIG. 2 illustrates a side view of an exemplary read head 118, in accordance with an embodiment of the invention. Read head 118 includes first, second and third modules 204, 212, 208, respectively, mounted to bases 202, 210, 206, respectively. The bases may be "U-beams" that are physically coupled together. First, second and third modules 204, 212, 208 each have a tape bearing surface 220, 224, 222 respectively, which may be flat, contoured, etc. Each module 204, 212, 208 may be configured for reading data, for example, from a tape 234, for transmission to read dataflow circuitry 112. Modules 204, 212, 208 may transmit data that is read via cables 226, which may couple the modules to read dataflow circuitry 112. Note that while the term "tape bearing surface" appears to imply that the surface facing tape 234 is in physical contact with the tape bearing surface, this is not necessarily the case. Rather, only a portion of the tape may be in contact with the tape bearing surface, constantly or intermittently, with other portions of the tape "flying" above the tape bearing surface on a layer of air, usually referred to as an "air bearing." By way of explanation, first module 204 can be referred to as the "leading" module as it is the first module encountered by tape 234 when moving from left to right. Second module 212 can be referred to as the "middle" module, and third module 208 can be referred to as the "trailing" module. The leading and trailing modules 204 and 208, respectively, are referred to collectively as outer modules. Note that outer modules 204 and 208 will alternate as leading modules, depending on the direction of travel of the tape 234.

In an exemplary embodiment, closures 214, 218, 216 are attached to modules 204, 212, 208, respectively, and serve to extend tape bearing surfaces 220, 224, 222, and to define gaps at the junctions of the modules and closures in which tape read elements, described in more detail below, are disposed. Locating the read elements interior to the edges of the tape bearing surfaces may serve to reduce wear and tear of the read elements resulting from direct contact from tape 234. Modules 204, 212, 208, and closures 214, 218, 216 may be made of a wear resistant substrate material, such as a ceramic. In some embodiments, middle module 212 has a closure, while the outer modules 204, 208 do not. Where there is no closure, preferably a hard coating is added to the module. One preferred coating is diamond-like carbon (DLC).

In one embodiment, as illustrated in FIG. 2, tape bearing surfaces 220, 224, 222 are in an "overwrap" configuration, in which the tape wrap angles $\alpha_1$, $\alpha_2$, and $\alpha_3$ can be considered to be negative with respect to their associated tape bearing surfaces. In this configuration, as will be described in more detail below, all modules may be used for read operations while the tape is moving in either direction. Illustrative wrap angles $\alpha_1$, $\alpha_2$, $\alpha_3$ may be in a range of about 0.5° to about 1.1°, though can be any angle that is advantageous to a design.

Each tape bearing surface 220, 224, 222 may include sharp leading edges, or "skiving" edges, where tape 234 will first contact the tape bearing surfaces. The skiving edges serve to "shear" air from the underside of tape 234 to prevent air from being drawn into the head-tape gap by the tape, so that atmospheric pressure may push the tape into substantially full contact, i.e., with a small tape fly height, over the longitudinal dimension, with respect to tape direction, of the tape bearing surfaces. A small amount of roundness or slope at the incoming edge may generate an unacceptably thick air bearing, separating the tape from the head, and its read elements, as described below, and present problems in reading high density recordings due to spacing loss effects.

In the embodiment illustrated in FIG. 2, first, second, and third modules 204, 212, 208 each have a closure 214, 218, 216, which extends the tape bearing surfaces of the associated modules, thereby effectively positioning the read elements away from the edge of the tape bearing surface. The closures can be a ceramic closure of a type typically found on tape heads. The closures 214, 216 of the outer modules 204, 208, however, may be shorter than closure 218 of second module 212 as measured parallel to a direction of tape travel over the respective module. This enables positioning the modules closer together. One way to produce shorter closures 214, 216 is to lap the standard ceramic closures of the second module 212 an additional amount. Another way is to plate or deposit thin film closures above the elements during thin film processing. For example, a thin film closure of a hard material such as Sendust or nickel-iron alloy (e.g., 45/55) can be formed on the module.

In operation, as tape 234 passes over the read elements in tape bearing surfaces 220, 224, 222 of read head 118, motion control system 110 transversely positions read heads 118 relative to the direction of longitudinal tape movement in order to read data from the data tracks in a particular data band of tape 234, as will be described in more detail below.

The illustrative embodiment of FIG. 2 shows a three-module read head 118 in a configuration that allows all three modules 204, 212, 208 to read data from tape 234 as tape 234 moves in either tape direction. Other embodiments may include a single read module, two modules, or another number of modules, in accordance with different embodiments of the invention. A description of various aspects related to tape head configurations that may be used in embodiments of the invention may be found in U.S. patent application Ser. No. 13/741,352, filed Jan. 14, 2013, which is hereby incorporated herein by reference in its entirety.

In alternative embodiments, one or more modules 204, 212, 208 of read head 118 may periodically engage the magnetic medium via, for example, a precision servo system that moves the module or the magnetic medium. This arrangement may be advantageous because the modules are only periodically in contact with the magnetic medium, and the performance characteristics of the supplemental module and its read elements may not to change or degrade appreciably over the life of the magnetic storage device, or another defined time period. In these embodiments in which the magnetic medium is a magnetic tape, the angles of the tape bearing surfaces, the wrap angles, the length of the closures, and other physical characteristics of the modules and the head assembly may be designed for a desired level of tape contact with the tape bearing surfaces to, for example, reduce wear and tear on the magnetic tape and the read element arrays of the modules.

Figure 3:
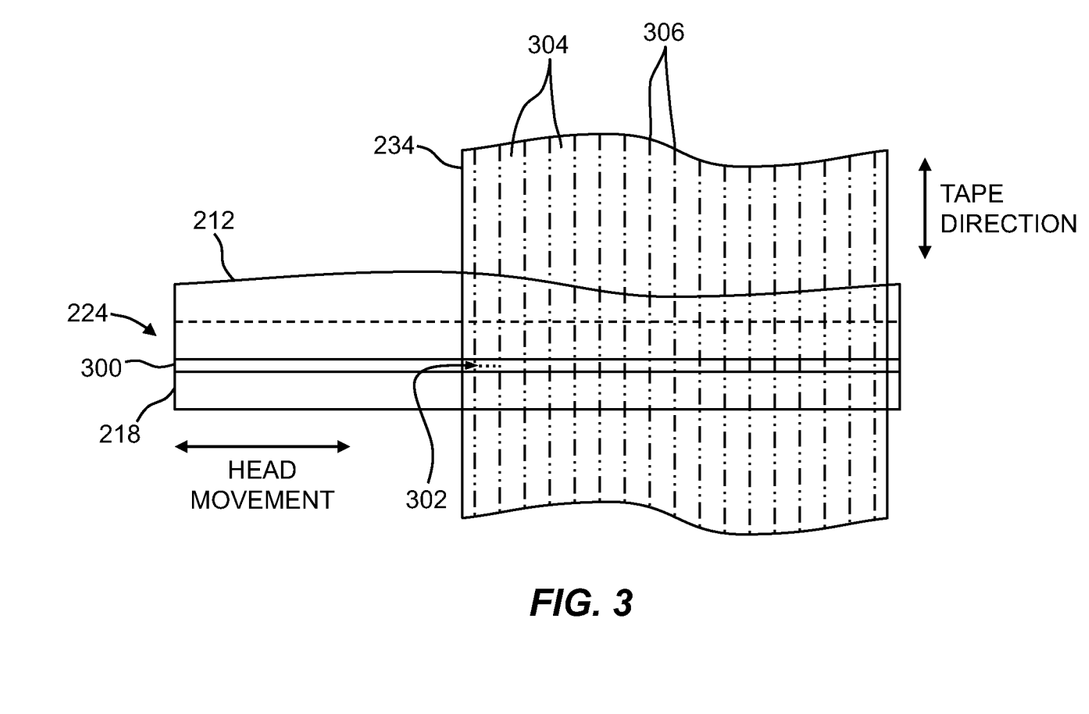
FIG. 3 illustrates a representative tape bearing surface of a module, in accordance with an embodiment of the present invention.

FIG. 3 illustrates a representative tape bearing surface 224 of module 212, from the perspective of a downward view, in accordance with an embodiment of the present invention. A representative tape 234 is shown, with servo tracks 306 indicated in dashed lines, and data bands 304 between the servo tracks 306. In this example, tape 234 includes 4 to 22 data bands 304, e.g., with 16 data bands 304 and 17 servo tracks 306, on a one-half inch wide tape 234. Each data band may include a number of data tracks, for example 1024 data tracks (not shown). Module 204 is preferably long enough to be able to support tape 234 as the head steps between data bands 304. During read operations, read elements of read element array 302, disposed in a gap 300 of tape bearing surface 224 of module 212 where the tape bearing surface of closure 218 abuts module 224, are positioned to specific track positions within one of the data bands 304. Outer read elements of read element array 302, which may be referred to as servo readers, read the servo tracks 306. The servo signals generated by the servo readers and received by motion control system 110 are used to align the read elements 302 with a particular set of data tracks during read operations.

Figure 4:
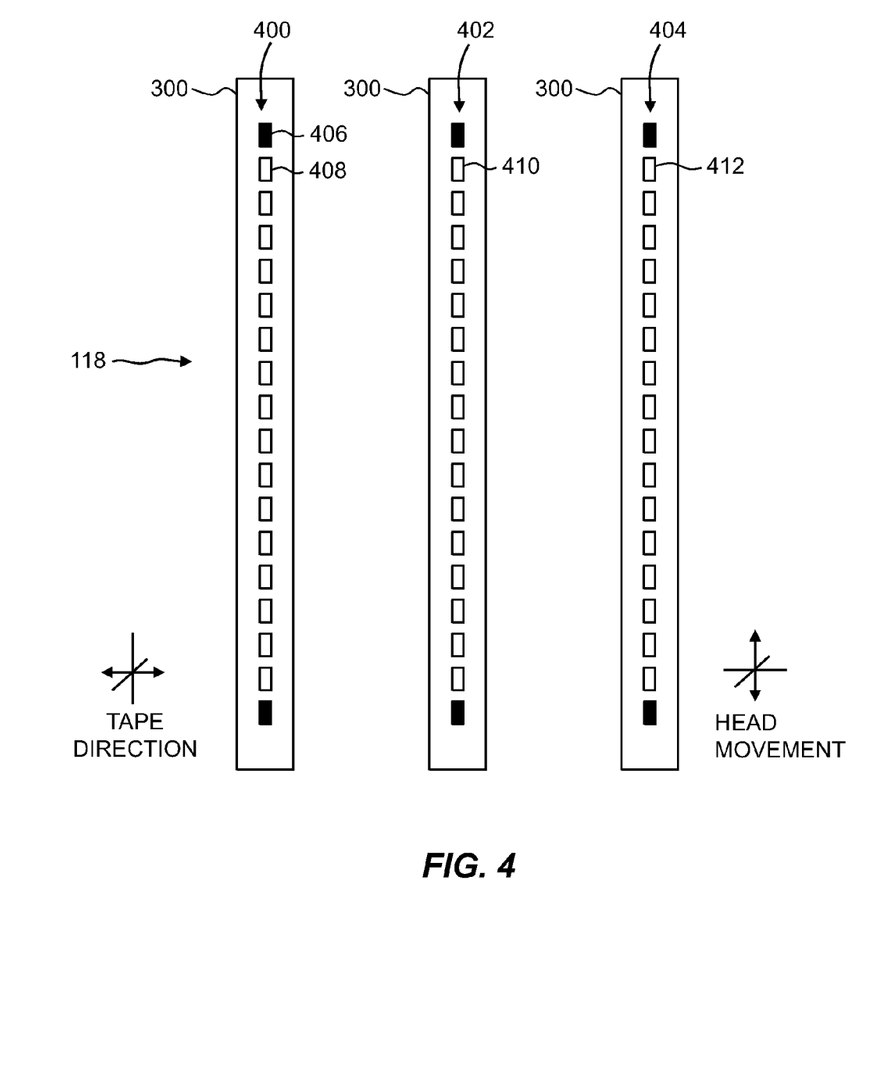
FIG. 4 illustrates read element arrays, in accordance with an embodiment of the present invention.

FIG. 4 depicts read element arrays 400, 402, 404 of read heads 118, which may be formed, for example, in gaps 300 of modules 204, 212, 208. As shown, the read element arrays may include, for example, 16 read elements 408, 410, 412, and two servo readers 406, though the number of elements may vary. Illustrative embodiments may include 8, 16, 32, 40, or 64 active read elements per array. An illustrative embodiment includes 32 read elements per array, where the actual number of transducer elements could be greater, e.g., 33, 34, etc. This may allow the tape to travel more slowly, thereby reducing speed-induced tracking and mechanical difficulties and/or execute fewer "wraps" to read the tape.

Figure 5:
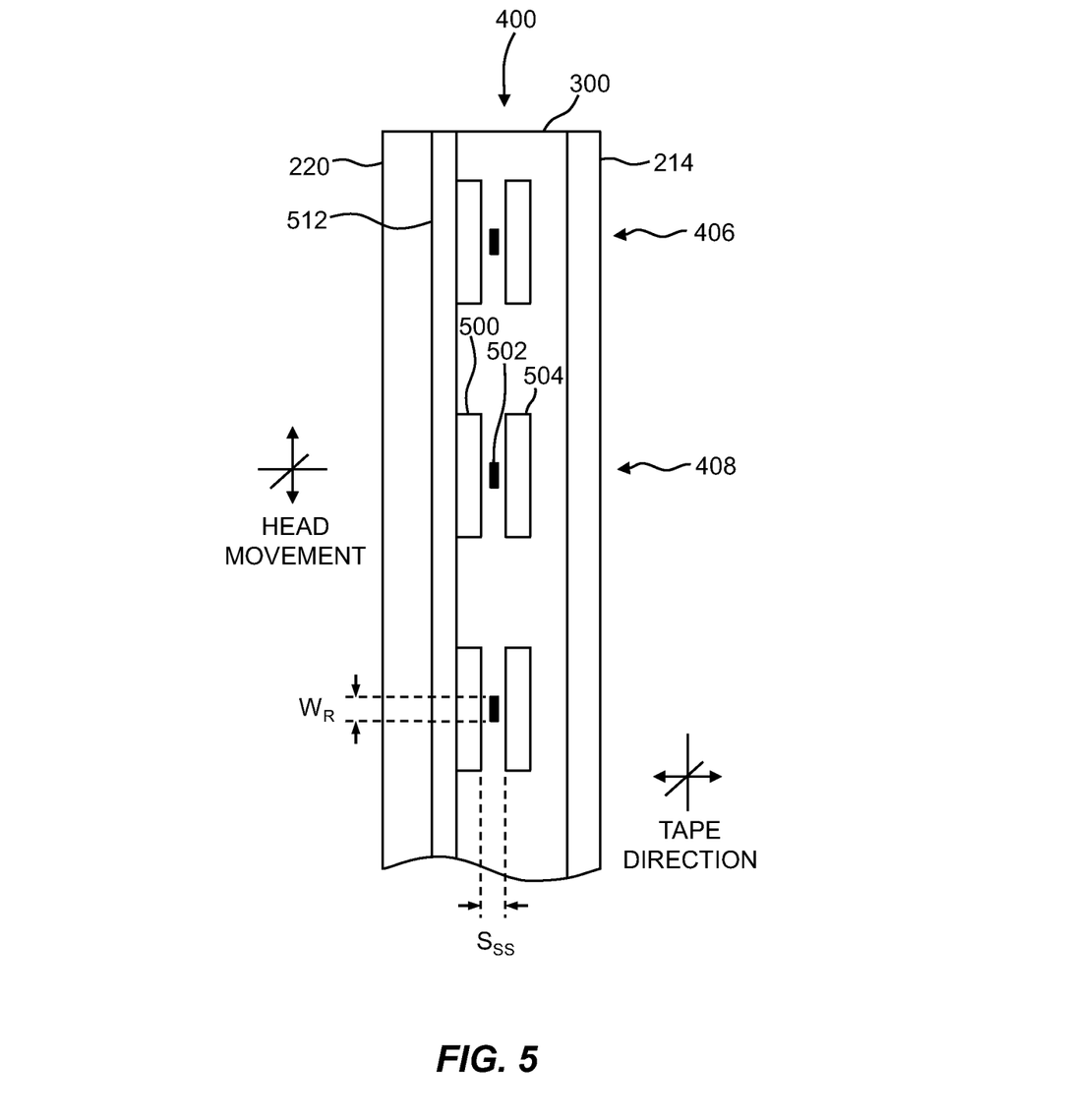
FIG. 5 illustrates a representative partial tape bearing surface, illustrating a read element array in additional detail, in accordance with an embodiment of the present invention.

FIG. 5 shows a representative partial tape bearing surface 220 of module 204 of read heads 118, from the perspective of a downward view, illustrating representative read element array 400 in additional detail, in accordance with an embodiment. Read element array 400 may have a plurality of read elements formed, for example, on the substrate material of module 204 and an optional electrically insulative layer 512. Several read elements 408 may be present, such as 8, 16, 32, etc. The read elements 408 as shown are linearly aligned in a direction generally perpendicular to the direction of tape travel. However, the read elements 408 may also be aligned diagonally, etc. Servo readers 406 are positioned on the outside of the one or more read elements 408.

Generally, the magnetic tape medium may move transversely across read element arrays 400, 402, 404, in either direction, and read heads 118 may be moved laterally, with respect to the tape direction, between data tracks and data bands 304 on the tape. The magnetic tape medium and read element arrays 400, 402, 404, operate in a transducing relationship in a manner known in the art.

In an embodiment, when a module is constructed, for example, module 204, layers are formed in the gap 300 created above the electrically conductive substrate material of module 204 (partially shown), e.g., of AlTiC, in generally the following order for the read elements 408, and similarly for servo readers 406: an insulating layer 512; a first shield 500 typically of an iron alloy such as NiFe, CZT or Al—Fe—Si (Sendust); a sensor 502 for sensing a data track on a magnetic medium of any known type, including those based on magnetoresistance (MR), giant MR (GMR), anisotropic MR (AMR), tunneling MR (TMR), etc.; and a second shield 504 typically of a nickel-iron alloy (e.g., ~80/20 at % NiFe, also known as permalloy). In preferred embodiments, due to its high magnetoresistive change and superior signaling characteristics, sensors 502 are TMR sensors.

Note that these materials are provided by way of example only, and other materials may be used. Additional layers such as insulation between the shields and an insulation layer surrounding the sensor may be present. Illustrative materials for the insulation include alumina and other oxides, insulative polymers, etc. Materials and construction of read elements 408, 410, 412, and read element arrays 400, 402, 404 may be directed to a specific generation of tape media, and may be optimized for a degree of longevity, to reduce buildup of debris, and/or other performance considerations.

As illustrated, in exemplary embodiments, each module 204, 212, 208 is fabricated with a single read element array 400, 402, 404. In other embodiments, a module may include more than one read element array, and a read element array may include more than one set of read elements. For example, a read element array, such as read element array 400 as illustrated in FIG. 5, may include two or more sets of read elements 408, arranged, for example, vertically as shown, each set forming a read element array.

In embodiments of the invention, read element arrays 400, 402, 404 may be optimized for a specific generation of a tape medium, such as LTO-6. Two or more of the read element arrays are configured to detect different characteristics of the magnetic transitions in a data track, for example, a data track 304, written to a magnetic recording media, such as tape 234. For example, in an embodiment, two or more read element arrays may have read sensors 502 having different sensor widths $W_R$ and shield-to-shield spacings $S_{SS}$, as illustrated on FIG. 5 (and FIGS. 6A and 6B). For example, a first array may be constructed with read sensors having nominal width (according to a standard or specification), and a second array may be constructed with read sensors having narrower widths, such as 30% of nominal. The first sensor array may provide electrical signals having characteristics that may be analyzed for such tape and data quality metrics as peak signal amplitude, SNR, transition parameter width, quality of the magnetic overwriting, and other standard client-usage-level metrics. The read sensors in the second array having narrower widths are more sensitive than the nominal width sensors to tape defects, such as dropouts. Analysis of the signals from the narrow width second array may identify the underlying problems resulting in quality issues identified from an analysis of the signals from the nominal width first array. Read sensors in a third array may have widths set to, for example, the maximum allowed by the specification, or the maximum allowed plus an additional percentage, such as 30%. The extra-wide sensors may identify track registration issues on the tape, as indicated by a high degree of noise. Analysis of signals from the extra-wide sensors in combination with analysis of signals from the nominal width sensors may identify the underlying cause of a low SNR experienced by the nominal width sensor array.

Similarly, two or more read element arrays may have sensors 502 with different shield-to-shield spacings $S_{SS}$. Compared to an array containing readers having a nominal $S_{SS}$, array readers with a narrow shield-to-shield spacings $S_{SS}$, for example, 50% of a nominal spacing, while having a lower overall output than a nominal array will have a flatter frequency response and a flatter SNR response. While the nominal array is required to determine a nominal quality of readback, having another array having narrower than nominal $S_{SS}$ provides a better than nominal assessment of SNR, spacing and PW50, which is not available from the nominal array data. Furthermore, information from two such arrays gives a combined higher confidence in determining quality of the data read from the media under assessment.

Read sensor width $W_R$, and read sensor shield-to-shield spacing $S_{SS}$ may be optimized for track density, linear density (bits/inch), head-to-tape spacing, and/or other physical and magnetic properties of a particular generation of tape, for example, LTO-6. In an exemplary embodiment, shield-to-shield spacing $S_{SS}$ may have a nominal value derived from the linear bit spacing, and read sensor width $W_R$ may have a nominal value of 30%-80% of the track width. As described above, an array having narrow width sensors may have sensors with $W_R$ of about 10%-30% of the nominal width, and arrays having extra-wide sensors may have sensors with width $W_R$ of about 90%-180% of the nominal width, and more preferably 90%-120% of the nominal width.

Figure 6A:
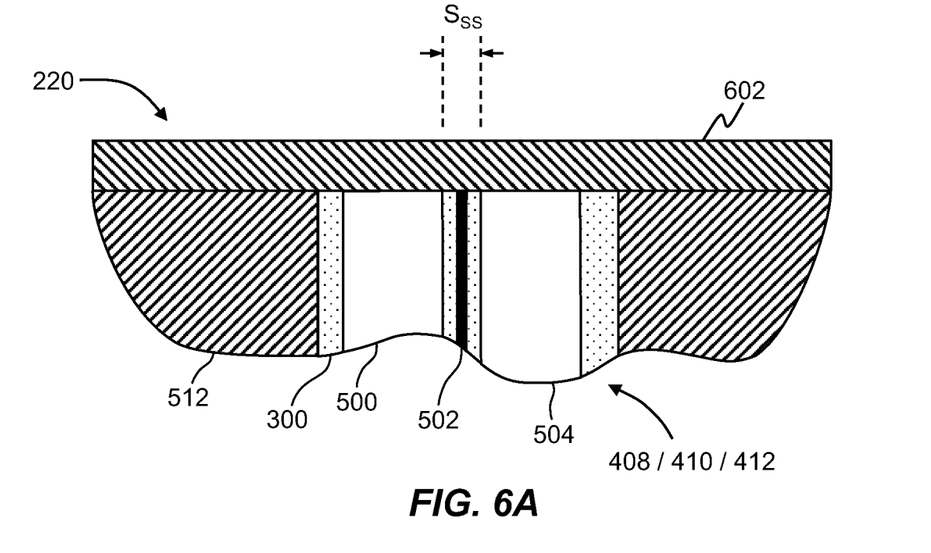
FIG. 6A illustrates construction of a read element, in accordance with an embodiment of the present invention.
Figure 6B:
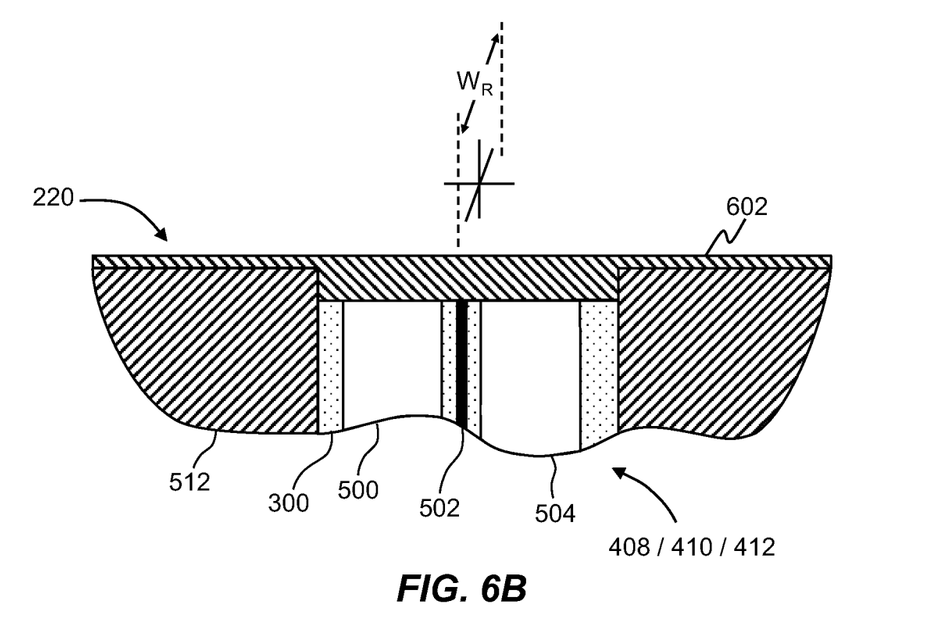
FIG. 6B illustrates construction of a read element, in accordance with another embodiment of the present invention.

In certain embodiments, as illustrated in FIG. 6A, a coating 602 may be applied to a read element 408, 410, 412 of a read element array during construction so as to force a defined separation between a tape bearing surface, such as tape bearing surface 220, and thus sensor 502 of the read element, and the tape. The separation will typically be a combination of the coating 602 depth plus the tape fly height over tape bearing surface 232. In certain embodiments, as illustrated by FIG. 6B, sensor 502 may be recessed a defined amount from tape bearing surface 232. The defined separation may force an extra degree of spacing loss in the magnetic field strength detected by a sensor 502 such that, for example, the signal resolution may be at or close to the minimum acceptable value, and may be used to detect sub-optimal, but within specification, SNR. In certain embodiments, coating 602 may be diamond-like carbon.

Based on the Wallace thickness loss response function, the magnetic field strength detected by a read element is proportional to $e^{-d/\lambda}$, where d is the element-to-tape separation, $\lambda$ is the recording wavelength, and k is a constant equal to $2\pi f/s$, where f=recording frequency, and s=tape speed in recording. Thus, the detected magnetic field strength decreases exponentially both with respect to separation between the tape and the read element, and with respect to recording density, which is inversely related to the recording wavelength $\lambda$. Based on this relationship, a defined spacing can be implemented that may increase, or enhance, the spacing loss to force a certain BER or low SNR at a relatively low degradation of magnetic field strength. Threshold values can be defined for one or more quality characteristics of the tape that can be detected by read elements, such that a detected performance characteristic below, or above, its related threshold value may indicate an unacceptable level of tape quality. In various embodiments, defined spacings between 5-50 nm may be used. A defined spacing, or range of spacings, may be determined without undue experimentation for a given tape media generation, a particular tape head 118 and supplemental head 230 construction, and/or a specific set of data written to the tape.

In various embodiments, meeting a particular nominal or other read sensor, read element, and/or read element array dimension, or other construction characteristic, may be less important than knowing the actual dimensions or characteristics of the sensor, element, or array. For example, the magnetic field strength at a sensor is generally proportional to the width of the read sensor, and decreases exponentially with respect to the element-to-tape spacing. If the sensor width, shield width, tape spacing, and response and sensitivity curves of the read sensor are known, a very accurate magnetic field strength measurement of the tape transitions may be obtained from an analysis of the electrical signals from the read sensor. In an embodiment, all read sensors in a read element array may be chosen to have substantially the same dimensions and/or characteristics through, for example, a binning process, or by physical measurements.

With respect to certain exemplary quality metrics, overwriting quality is important for data integrity. An exemplary method for determining overwriting quality is to compare Fast Fourier Transforms (FFTs) of electrical signals from one or more element arrays, and determine the magnitude of particular frequency components that correspond to certain pattern frequencies. Furthermore, write head-to-media spacing may be determined, for example, by a technique that uses an FFT analysis of regular patterns written to the magnetic media.

In an embodiment, signals generated by read sensors 502 of element arrays 400, 402, 404 are transmitted to read dataflow circuitry 112, which transmits the signals, or corresponding information, to microprocessor controller 106. In an embodiment, microprocessor controller 106 includes firmware and/or software to process and analyze the signals from read element arrays 400, 402, 404, and determine certain quality characteristics, such as one or more of those described above, of the magnetic transitions on the tape, the data on the tape, and/or the tape medium. In other embodiments, microprocessor controller 106 may only process the signals from read element arrays 400, 402, 404, and transmit information to host CPU 102 for further analysis with regard to quality metrics, by an analysis program, for example, one of application program(s) 828 (see FIG. 8) that may reside on host CPU 102. For example, read dataflow circuitry 112 may perform a pre-processing function on the signals it receives from each read element array, such as combining or averaging the signals from all or some of the read elements in an array, before sending this information to microprocessor controller 106. Similarly, microprocessor controller 106 may perform pre-processing or a degree of pre-analysis before sending signals and other information from the read element arrays to host CPU 102. In certain embodiments, analysis may be performed on aggregated signals from a read sensor array. In other embodiments, analysis may be performed on signals from each read sensor of an array. When, for example, microprocessor controller 106 determines that a quality metric does not meet its associated threshold value, it may, for example, transmit a warning message to host CPU 102.

While embodiments of the invention have been described with respect to a tape appliance and a tape medium, those of skill in the art will recognize that the inventive concepts described herein may be implemented in embodiments directed to related magnetic storage technologies, without undue experimentation, and without departing from the spirit of the invention, and these are, therefore, considered to be within the scope of the invention, as defined in the claims below. For example, with respect to hard disk drive (HDD) technology, a special purpose set of heads may be constructed having read elements of varying characteristics, as described above, for reading magnetic transitions in a data track in the magnetic media of an HDD platter. The same or similar quality metrics related to the magnetic transitions on the platter, and the quality of the platter itself, may be determined, based on established standards and specifications, and analysis of the electrical signals generated by the read elements of the special purpose heads.

Figure 7:
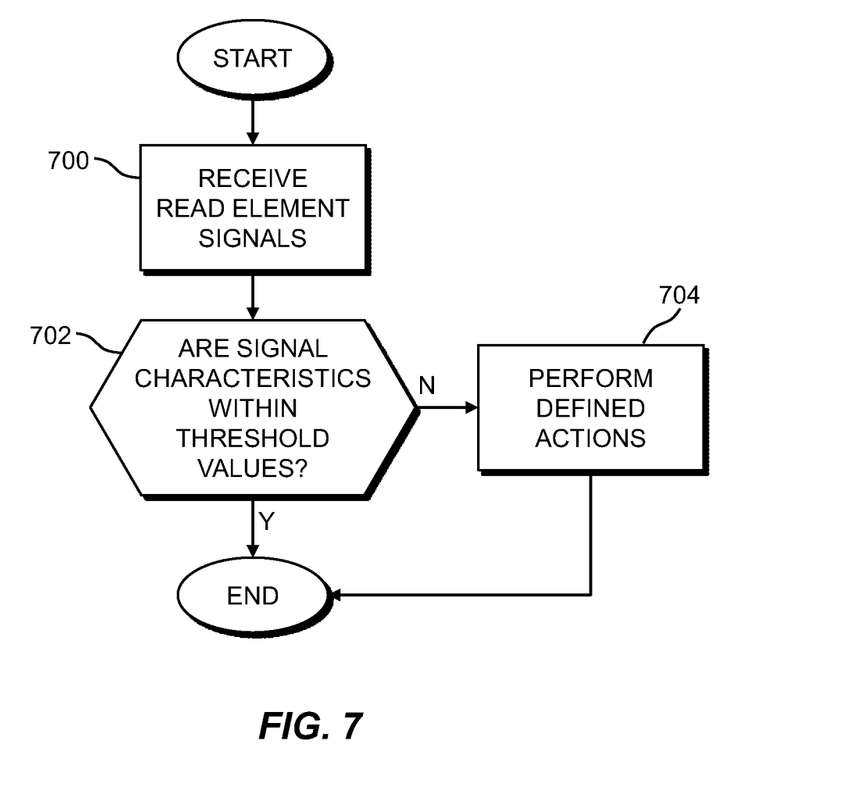
FIG. 7 is a flowchart depicting operational steps that a microprocessor may perform, in accordance with an embodiment of the invention.

FIG. 7 is a flowchart depicting operational steps that microprocessor controller 106 may perform in determining whether transitions on a magnetic recording media, such as a magnetic tape, meet defined quality metrics, in accordance with an embodiment of the invention. In an embodiment, microprocessor controller 106 receives electrical signals from, for example, read elements 408, 410, 412 of read element arrays 400, 402, 404 in tape bearing surfaces 220, 224, 222 of modules 204, 212, 208 (step 700). In certain embodiments, microprocessor controller may receive, for example, the electrical signals from read dataflow circuitry 112, or may receive information generated by read dataflow circuitry 112 that corresponds to an aggregate of the signals of each element array, or may receive information corresponding to each electrical signal generated by each read element 408, 410, 412.

Microprocessor controller 106 determines various quality metrics of the received electrical signals or information, and compares the characteristics to threshold values or ranges (decision step 702). In certain embodiments, these quality metrics may be retained, for example, by host CPU 102, for historical analysis. In various embodiments, certain quality metrics of the magnetic medium and data may be determined based on analysis of the signals from one read element array. In other embodiments, certain quality metrics may be determined based on analysis of the signals of two or more read elements or read element arrays for a certain portion of the magnetic medium.

If microprocessor controller 106 determines that one or more quality metrics are not within a desired range (decision step 702, "N" branch), then the microprocessor controller performs certain defined actions (step 704). For example, if certain quality metrics are not meeting a defined threshold value, a message may be generated by microprocessor controller 106 and transmitted to host CPU 102. After the analysis of a defined portion of the magnetic medium, which may be a portion or all or the data tracks and/or other data written to the medium, this processing ends.

If microprocessor controller 106 determines that all performance characteristics are within their associated desired ranges (decision step 704, "Y" branch), then this processing ends.

Figure 8:
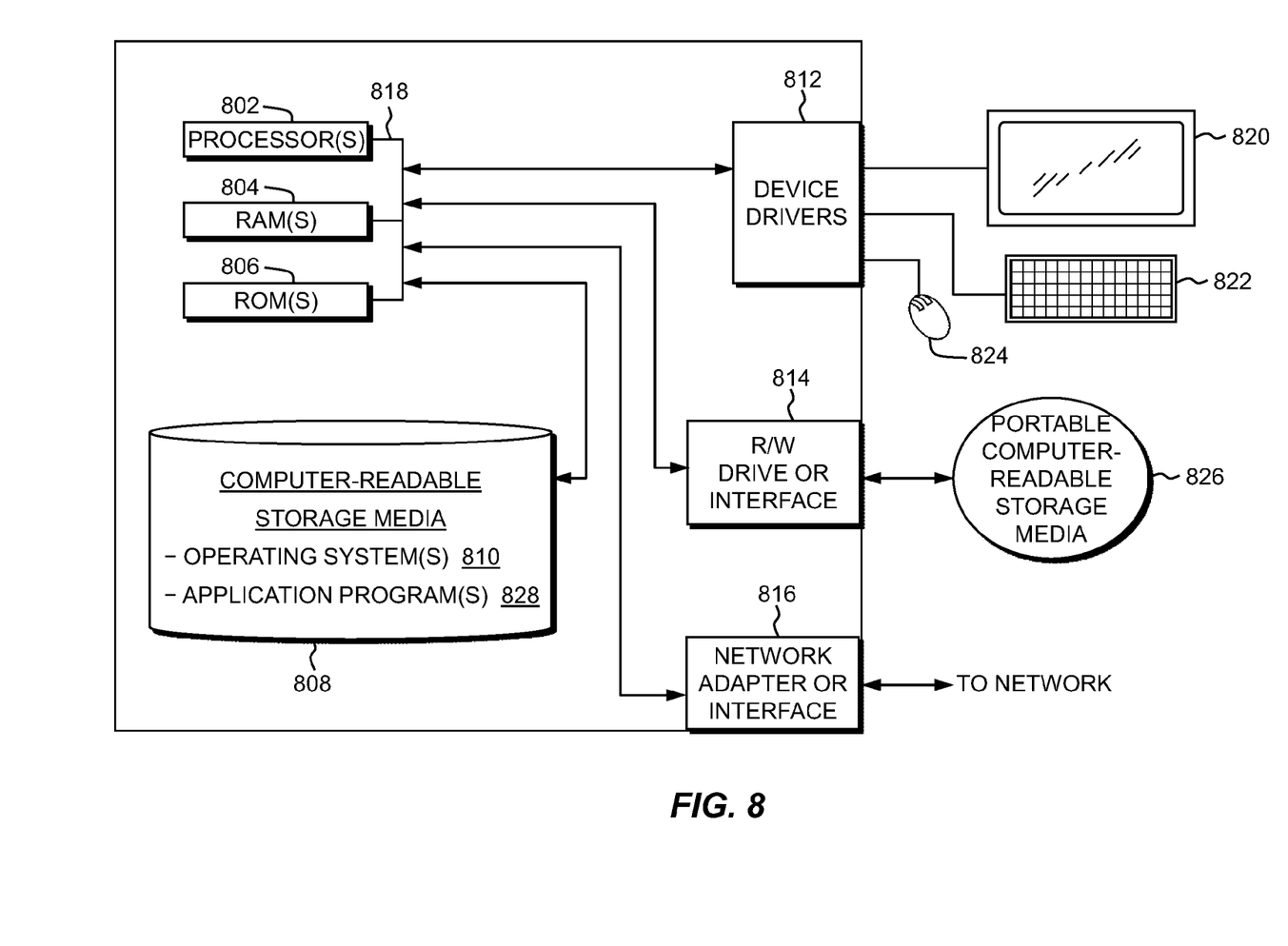
FIG. 8 illustrates a block diagram of components of a host, in accordance with an embodiment of the present invention.

FIG. 8 depicts a block diagram of components of host CPU 102, in accordance with an embodiment of the present invention. It should be appreciated that FIG. 8 provides only an illustration of one implementation and does not imply any limitations with regard to the environments in which different embodiments may be implemented. Many modifications to the depicted environment may be made.

Host CPU 102 can include one or more processors 802, one or more computer-readable RAMs 804, one or more computer-readable ROMs 806, one or more computer-readable storage media 808, device drivers 812, read/write drive or interface 814, network adapter or interface 816, all interconnected over a communications fabric 818. Communications fabric 818 can be implemented with any architecture designed for passing data and/or control information between processors (such as microprocessors, communications and network processors, etc.), system memory, peripheral devices, and any other hardware components within a system.

One or more operating systems 810 and application program(s) 828 are stored on one or more of the computer-readable storage media 808 for execution by one or more of the processors 802 via one or more of the respective RAMs 804 (which typically include cache memory). In the illustrated embodiment, each of the computer-readable storage media 808 can be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

Host CPU 102 can also include a R/W drive or interface 814 to read from and write to one or more portable computer-readable storage media 826. Application program(s) 828 on host CPU 102 can be stored on one or more of the portable computer-readable storage media 826, read via the respective R/W drive or interface 814 and loaded into the respective computer-readable storage media 808.

Host CPU 102 can also include a network adapter or interface 816, such as a TCP/IP adapter card or wireless communication adapter (such as a 4G wireless communication adapter using OFDMA technology). Application program(s) on host CPU 102 can be downloaded to the computing device from an external computer or external storage device via a network (for example, the Internet, a local area network or other, wide area network or wireless network) and network adapter or interface 816. From the network adapter or interface 816, the programs are loaded into the computer-readable storage media 808. The network may comprise copper wires, optical fibers, wireless transmission, routers, firewalls, switches, gateway computers and/or edge servers.

Host CPU 102 can also include a display screen 820, a keyboard or keypad 822, and a computer mouse or touchpad 824. Device drivers 812 interface to display screen 820 for imaging, to keyboard or keypad 822, to computer mouse or touchpad 824, and/or to display screen 820 for pressure sensing of alphanumeric character entry and user selections. The device drivers 812, R/W drive or interface 814 and network adapter or interface 816 can comprise hardware and software (stored in computer-readable tangible storage device 808 and/or ROM 806).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Although preferred embodiments have been depicted and described in detail herein, it will be apparent to those skilled in the relevant art that various modifications, additions, substitutions and the like can be made without departing from the spirit of the invention, and these are, therefore, considered to be within the scope of the invention, as defined in the following claims.

What is claimed is:

1. An apparatus comprising:
   three or more read element arrays;
   each read element array includes one or more read elements;
   each read element includes a sensor;
   a first read element array having a first sensor, the first sensor having a first sensor width and being configured to detect a first set of quality metrics associated with a magnetic recording medium, including a peak signal amplitude, a signal-to-noise ratio (SNR), a transition parameter width, and a quality of magnetic overwriting;
   a second read element array having a second sensor, the second sensor having a second sensor width that is less than the first sensor width, and wherein the second read element array is configured to detect a second set of quality metrics associated with the magnetic recording medium, including dropouts;
   a third read element array having a third sensor, the third sensor having a third sensor width that is greater than the first sensor width, and wherein the third read element array is configured to detect a third set of quality metrics associated with the magnetic recording medium, including track registration issues;
   a computer that receives information from at least one of the first, second, and third read element arrays and includes logic to determine one or more values associated with at least one quality metric included in at least one of the first, second, and third sets of quality metrics;
   determining, by the computer, whether the one or more values associated with the at least one quality metric do not satisfy one or more threshold values associated with the at least one quality metric; and
   based on the computer determining that the one or more values associated with the at least one quality metric do not satisfy one or more threshold values associated with the at least one quality metric, generating a notification indicating that the one or more values associated with the at least one quality metric are of unacceptable quality.

2. An apparatus in accordance with claim 1, wherein the computer contains logic to analyze information from at least two of the first, second, and third read element arrays to determine one or more values associated with at least one quality metric included in at least one of the first, second, and third sets of quality metrics.

3. An apparatus in accordance with claim 1, wherein the sensor is a tunnel magnetoresistance (TMR) sensor.

4. An apparatus in accordance with claim 1, further comprising: a fourth read element array having one or more sensors, the one or more sensors recessed a defined distance from a tape bearing surface.

5. An apparatus in accordance with claim 4, wherein the fourth read element array is configured to detect a sub-optimal signal-to-noise ratio (SNR).

6. An apparatus in accordance with claim 1, wherein:
   the first sensor width is one or more of: a width derived from a standard or specification, 30%-80% of the width of the data tracks on the magnetic recording medium, and more preferably 50%-70%;
   the third sensor width is at least one of: 90%-180% of the first sensor width, and more preferably 90%-120% of the first sensor width; and
   the second sensor width is 10%-30% of the first sensor width.

7. An apparatus in accordance with claim 4, wherein the defined distance between the one or more sensors and the magnetic recording medium is configured to force a specific bit error rate and a specific signal-to-noise ratio.

8. An apparatus in accordance with claim 1, wherein the magnetic recording medium is a magnetic tape, and the three or more read element arrays periodically engage the magnetic tape one or more of: once per a defined number of wraps of the tape around a supply reel or take up reel, after a defined elapsed tape recording appliance operation time, after a defined tape length that moves across a tape head module, when a tape is loaded to a tape recording appliance, when a bit error rate (BER) exceeds a threshold value.

9. An apparatus in accordance with claim 4, wherein the defined distance between the one or more sensors and the magnetic recording medium is one or more of: such that a signal resolution measurement value is approximately a minimum acceptable value; approximately between 5 nm and 50 nm.

10. A method comprising:
    receiving, by a computer, information corresponding to a first set of quality metrics associated with a magnetic recording medium from a first read element array having a first sensor width, wherein the first set of quality metrics includes a peak signal amplitude, a signal-to-noise ratio (SNR), a transition parameter width, and a quality of magnetic overwriting;

receiving, by a computer, information corresponding to a second set of quality metrics from a second read element array having a second sensor width that is less than the first sensor width, wherein the second set of quality metrics includes dropouts;

receiving, by a computer, information corresponding to a third set of quality metrics from a third read element array having a third sensor width that is greater than the first sensor width, wherein the second set of quality metrics includes track registration issues;

determining, by the computer, one or more values associated with at least one quality metric included in at least one of the first, second, and third sets of quality metrics based on the received information;

determining, by the computer, whether the one or more values associated with the at least one quality metric do not satisfy one or more threshold values associated with the at least one quality metric; and based on the computer determining that the one or more values associated with the at least one quality metric do not satisfy one or more threshold values associated with the at least one quality metric, generating a notification indicating that the one or more values associated with the at least one quality metric are of unacceptable quality.

11. A method in accordance with claim 10, further comprising: analyzing information received from at least two of the first, second, and third read element arrays to determine a one or more values associated with at least one quality metric included in at least one of the first, second, and third sets of quality metrics.

12. A method in accordance with claim 10, wherein:
the first sensor width is one or more of: a width derived from a standard or specification, 30%-80% of the width of the data tracks on the magnetic recording medium, and more preferably 50%-70%;
the third sensor width is at least one of: 90%-180% of the first sensor width, and more preferably 90%-120% of the first sensor width; and
the second sensor width is 10%-30% of the first sensor width.

13. A method in accordance with claim 10, wherein:
an element array is constructed with sensors disposed a distance away from a magnetic recording medium when the element array engages the magnetic recording medium such that a signal resolution value derived from the sensors is less than a nominal signal resolution value.

14. A method in accordance with claim 10, further comprising:
receiving, by a computer, information corresponding to a fourth read element array having one or more sensors, wherein the one or more sensors are recessed a defined amount from a tape bearing surface and configured for at least one of: forcing a specific bit error rate, forcing a specific signal-to-noise ratio, and detecting a sub-optimal signal-to-noise ratio (SNR).

* * * * *